United States Patent
Dalal et al.

(10) Patent No.: US 11,331,833 B2
(45) Date of Patent: May 17, 2022

(54) SYSTEMS AND METHODS OF CURING A THERMOSET COMPOSITE TO A DESIRED STATE OF CURE

(71) Applicants: The Boeing Company, Chicago, IL (US); Toray Industries, Inc., Tokyo (JP)

(72) Inventors: Hardik Dalal, Seattle, WA (US); Karl M. Nelson, Issaquah, WA (US); Travis James Sherwood, Seattle, WA (US); Felix N. Nguyen, Des Moines, WA (US)

(73) Assignees: The Boeing Company, Chicago, IL (US); Toray Industries, Inc., Tokyo (JP)

( * ) Notice: Subject to any disclaimer, the term of this patent is extended or adjusted under 35 U.S.C. 154(b) by 328 days.

(21) Appl. No.: 16/484,771

(22) PCT Filed: Mar. 15, 2018

(86) PCT No.: PCT/US2018/022731
§ 371 (c)(1),
(2) Date: Aug. 8, 2019

(87) PCT Pub. No.: WO2018/170314
PCT Pub. Date: Sep. 20, 2018

(65) Prior Publication Data
US 2020/0009765 A1 Jan. 9, 2020

Related U.S. Application Data

(60) Provisional application No. 62/472,360, filed on Mar. 16, 2017.

(51) Int. Cl.
*B29C 35/02* (2006.01)
*B29C 37/00* (2006.01)
(Continued)

(52) U.S. Cl.
CPC ...... *B29C 35/0288* (2013.01); *B29C 2037/90* (2013.01); *B29K 2101/10* (2013.01); *B29L 2031/3085* (2013.01)

(58) Field of Classification Search
CPC .......... B29C 35/0288; B29C 66/73753; B29C 66/73754; B29C 66/7394; B29C 66/73941
See application file for complete search history.

(56) References Cited

U.S. PATENT DOCUMENTS 3,718,721 A * 2/1973 Gould ................ B29C 35/0288
264/40.6
5,207,956 A 5/1993 Kline et al.
(Continued)

FOREIGN PATENT DOCUMENTS

CN 104837605 8/2015
CN 105936131 9/2016
(Continued)

OTHER PUBLICATIONS

Machine-generated English language translation of the abstract of CN 104837605, downloaded from Esapcenet.com on Apr. 2, 2021.
(Continued)

*Primary Examiner* — Niki Bakhtiari
*Assistant Examiner* — John J DeRusso
(74) *Attorney, Agent, or Firm* — Dascenzo Gates Intellectual Property Law, P.C.

(57) ABSTRACT

Systems and methods of curing a thermoset composite (TSC) to a target state of cure (SOC) are disclosed herein. The methods include heating the thermoset composite to greater than a threshold temperature. During the heating, the methods further include monitoring an actual temperature of the thermoset composite, determining a maximum temperature achieved by the thermoset composite, and determining (Continued)

an elapsed time that the actual temperature of the thermoset composite is greater than the threshold temperature. The methods further include ceasing the heating based, at least in part, on the maximum temperature of the TSC and the elapsed time. The systems include a heating assembly, a support mandrel, a thermoset composite, a temperature detector, and a controller programmed to perform the methods.

20 Claims, 6 Drawing Sheets

(51) Int. Cl.
  *B29K 101/10* (2006.01)
  *B29L 31/30* (2006.01)

(56) References Cited

U.S. PATENT DOCUMENTS

| | | | |
|---|---|---|---|
| 5,453,226 A * | 9/1995 | Kline | B29C 35/0288 |
| | | | 264/40.1 |
| 6,490,501 B1 | 12/2002 | Saunders | |
| 8,834,668 B2 | 9/2014 | Nelson et al. | |
| 9,051,062 B1 | 6/2015 | Boone et al. | |
| 9,302,455 B1 | 4/2016 | Boone et al. | |
| 2010/0298979 A1 * | 11/2010 | Christopher | B29C 35/0227 |
| | | | 700/274 |
| 2012/0283348 A1 | 11/2012 | Akita et al. | |
| 2014/0072775 A1 * | 3/2014 | De Mattia | B29C 70/549 |
| | | | 428/175 |
| 2014/0144568 A1 | 5/2014 | MacAdams et al. | |
| 2014/0216635 A1 | 8/2014 | Zahlen et al. | |
| 2014/0302446 A1 | 10/2014 | Anderson et al. | |
| 2014/0318693 A1 | 10/2014 | Nelson et al. | |
| 2015/0056433 A1 | 2/2015 | MacAdams et al. | |
| 2016/0214328 A1 | 7/2016 | MacAdams et al. | |
| 2016/0257427 A1 | 9/2016 | Humfeld et al. | |
| 2016/0318214 A1 | 11/2016 | Pinillos Martinez et al. | |
| 2021/0206126 A1 * | 7/2021 | Shimizu | B29C 33/02 |

FOREIGN PATENT DOCUMENTS

| | | |
|---|---|---|
| EP | 1151850 | 11/2001 |
| EP | 1547753 | 6/2005 |
| EP | 2055464 | 5/2009 |
| EP | 3088152 | 11/2016 |
| FR | 2675711 | 10/1992 |
| WO | WO 2012/002340 | 1/2012 |
| WO | WO 2014/081652 | 5/2014 |

OTHER PUBLICATIONS

Machine-generated English language translation of the abstract of CN 105936131, downloaded from Esapcenet.com on Apr. 2, 2021.
Machine-generated English translation of the abstract of FR 2675711, downloaded from Espacenet.com Aug. 6, 2019.
Machine-generated English translation of the abstract of WO 2012/002340, downloaded from Espacenet.com Aug. 6, 2019.
European Patent Office, International Search Report and Written Opinion for related PCT Application No. PCT/US2018/022748, dated Jun. 4, 2018.
European Patent Office, International Preliminary Report on Patentability and Written Opinion for related PCT Application No. PCT/US2018/022748, dated Sep. 17, 2019.

* cited by examiner

SYSTEMS AND METHODS OF CURING A THERMOSET COMPOSITE TO A DESIRED STATE OF CURE

RELATED APPLICATIONS

This application claims priority to U.S. Provisional Patent Application Ser. No. 62/472,360, which was filed on Mar. 16, 2017, entitled SYSTEMS AND METHODS OF CURING A THERMOSET COMPOSITE TO A DESIRED STATE OF CURE, the complete disclosure of which is hereby incorporated by reference.

FIELD OF DISCLOSURE

The present disclosure relates generally to systems and methods of curing a thermoset composite to a target state of cure.

BACKGROUND OF THE DISCLOSURE

Thermoset composites are utilized in a variety of parts, products, and/or industries. Materials for these thermoset composites may include resin-impregnated textiles, or fiber tows, (e.g., pre-preg) and/or dry fiber beds (e.g., pre-forms) that may be swept and/or injected with resin prior to cure. In either case, the resin, which also may be referred to herein as a thermosetting resin, may be latent, non-reactive, or at least substantially non-reactive at room, or ambient, temperatures.

Such thermoset composites generally are laid up while in a flexible, uncured state, which also may be referred to herein as a green state, and subsequently are heated. The heating cures the thermoset composite, such as by cross-linking the resin, and transitions the thermoset composite to a cured state. The crosslinking also may be referred to herein as polymerizing the resin.

In certain applications, such as the aerospace industry, cured thermoset composite parts, which may be fabricated from thermoset composites, may be extremely large. As examples, fuselage barrel sections of aircraft, wings of aircraft, and/or tail sections of aircraft may be formed from thermoset composites. Such large thermoset composite parts require large layup mandrels for layup and also require large heating assemblies, such as autoclaves, ovens, and/or presses, to cure the thermoset composite part. The large layup mandrels and large heating assemblies are expensive and require a significant amount of factory space. As such, economical fabrication of the cured thermoset composite part may require that the large layup mandrels and large heating assemblies be utilized in an efficient manner.

Prior art methods of curing a thermoset composite generally rely upon heating the uncured thermoset composite to above a threshold temperature for at least a threshold time to produce a cured thermoset composite part. Such methods, in nearly all instances, are designed to ensure complete, or nearly complete, curing of the thermoset composite, are a resource-intensive approach to curing the thermoset composite, and may not best utilize factory equipment and/or capacity. Thus, there exists a need for improved methods of curing a thermoset composite to a target state of cure.

SUMMARY OF THE DISCLOSURE

Systems and methods of curing a thermoset composite (TSC) to a target state of cure (SOC) are disclosed herein. The methods include heating the thermoset composite to greater than a threshold temperature. During the heating, the methods further include monitoring an actual temperature of the thermoset composite, determining a maximum temperature achieved by the thermoset composite, and determining an elapsed time that the actual temperature of the thermoset composite is greater than the threshold temperature. The methods further include ceasing the heating based, at least in part, on the maximum temperature of the TSC and the elapsed time.

The systems include a heating assembly, a support mandrel, a thermoset composite, a temperature detector, and a controller programmed to perform the methods. The heating assembly is configured to regulate a temperature of a heated environment. The support mandrel is positioned within the heated environment. The thermoset composite is positioned within the heated environment and is supported by the support mandrel. The temperature detector is configured to monitor a temperature of the thermoset composite. The controller is programmed to receive the temperature of the thermoset composite from the temperature detector and to control the temperature of the heated environment by controlling the operation of the heating assembly.

DETAILED DESCRIPTION AND BEST MODE OF THE DISCLOSURE

Figure 1:
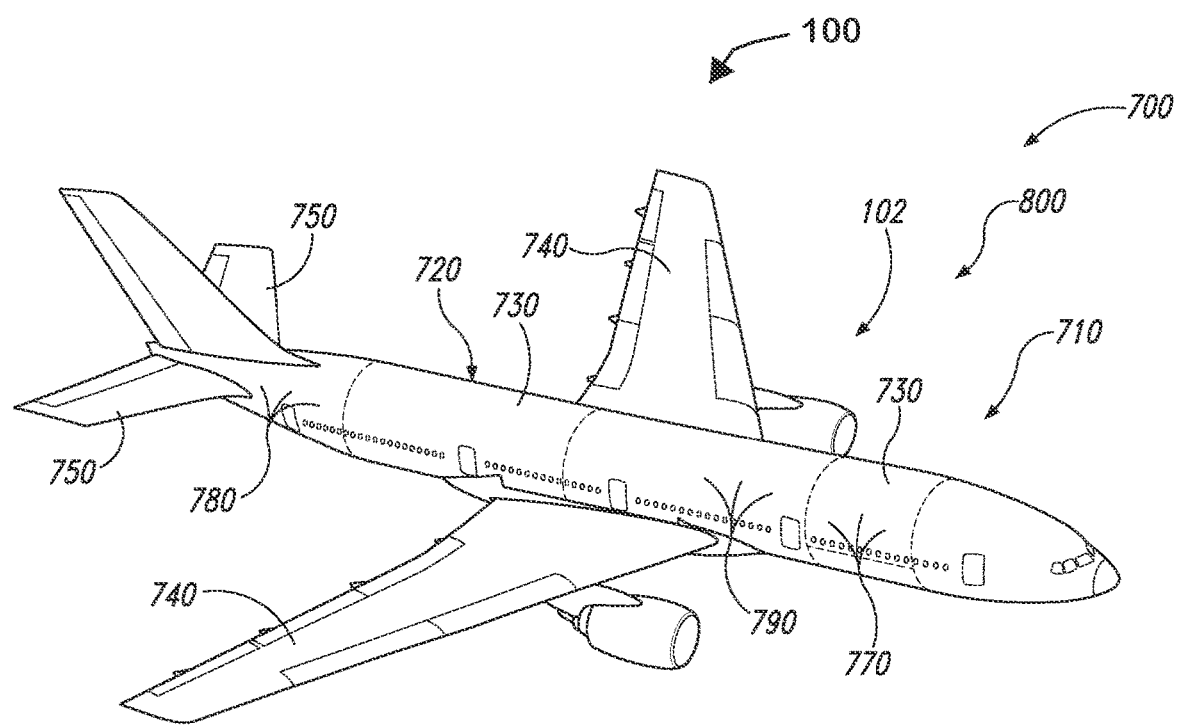
FIG. 1 is an example of an aircraft that includes a composite structure that may be formed using the systems and methods according to the present disclosure.

FIGS. 1-10 provide illustrative, non-exclusive examples of methods 200, according to the present disclosure, of thermoset composites that may be fabricated utilizing methods 200, and/or of data and/or information that may be generated and/or utilized during methods 200. Elements that serve a similar, or at least substantially similar, purpose are labeled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be included in and/or utilized with any of FIGS. 1-10 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
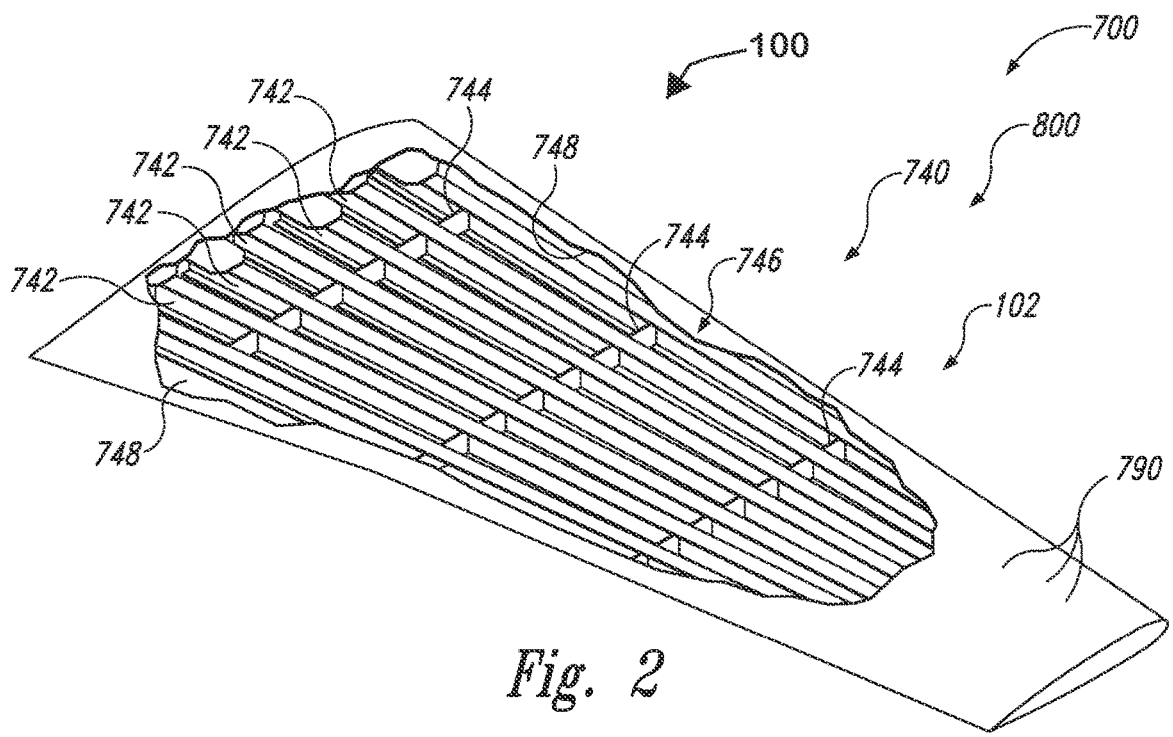
FIG. 2 is an example of a wing that may form a portion of the aircraft of FIG. 1.

FIG. 1 is an example of an aircraft 700 that includes a composite structure 800 that may include a cured thermoset composite part 100 that may be at least partially constructed from a thermoset composite utilizing methods 200, according to the present disclosure. FIG. 2 is an example of a wing 740 that may form a portion of aircraft 700. Aircraft 700 may include a plurality of components, including an airframe 710, a fuselage 720, a fuselage barrel 730, wing 740, and/or a stabilizer 750.

Composite structure 800 of aircraft 700 may include a plurality of plies 102 of composite material, which may form cured thermoset composite part 100 and/or which may form a portion of any suitable component of aircraft 700. As an example, and as illustrated in FIG. 1, aircraft 700 may include skin segments 790 that may form, cover, and/or be an outer surface of any suitable portion of aircraft 700 and/or a plurality of stringers 770 that, together with a plurality of frames 780, may support an inner surface of skin segments 790. As another example, and as illustrated in FIG. 2, wing 740 may include a plurality of wing stringers 742, which may extend along a length of the wing. Wing 740 also may include a plurality of ribs 744. Wing stringers 742 and ribs 744 together may form and/or define at least a portion of an inner support structure 746 for wing 740, which may support an inner surface 748 of skin segments 790 that cover wing 740. These skin segments also may be referred to herein as wing skin segments 790. Skin segments 790 (or wing skin segments 790), stringers 770, frames 780, wing stringers 742, ribs 744, and/or inner support structure 746 may be at least partially, or even completely, formed from plies 102 of composite material and/or may be a cured thermoset composite part 100 that may be formed utilizing method 200 disclosed herein.

Figure 3:
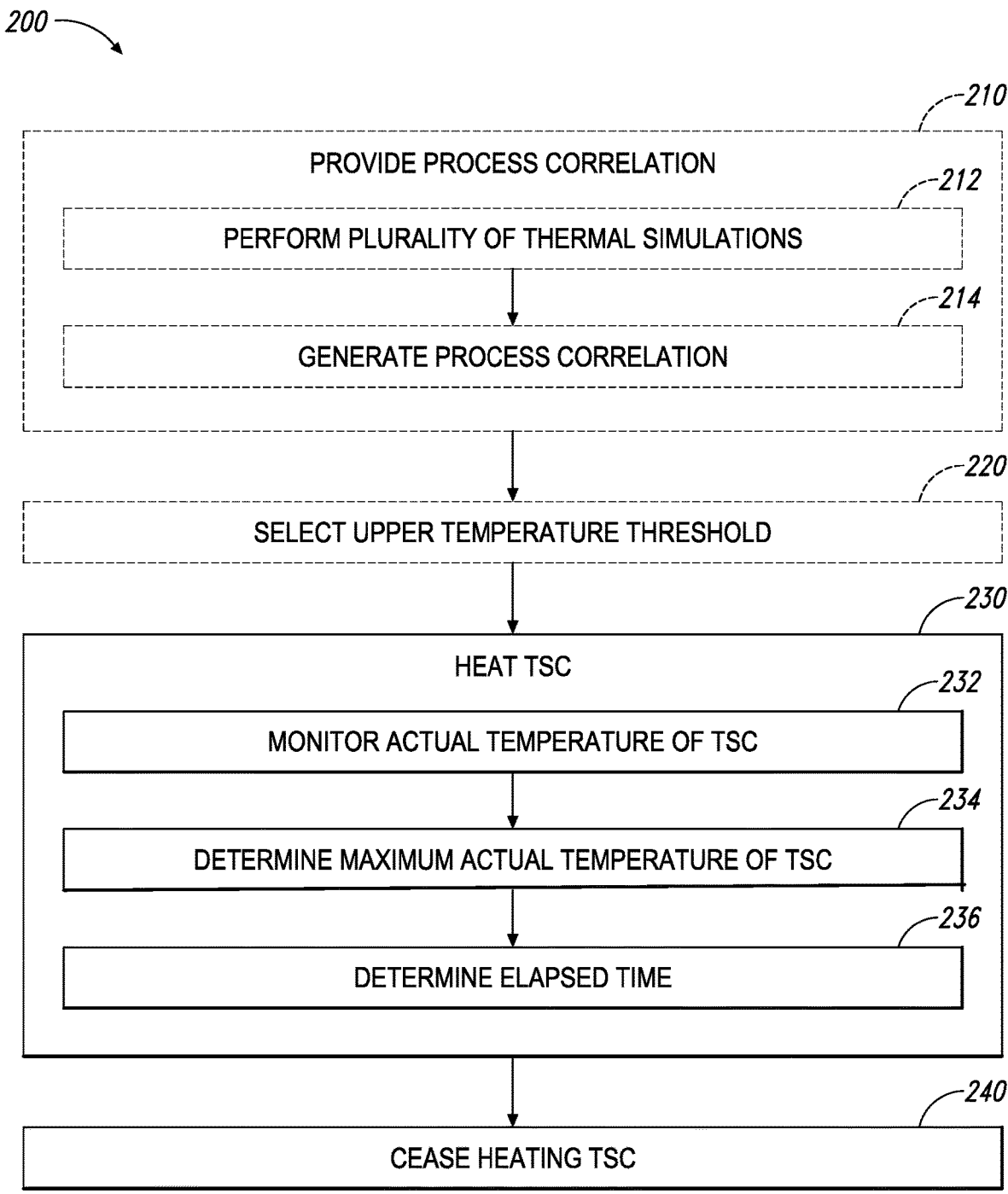
FIG. 3 is a flowchart depicting methods, according to the present disclosure, of curing a thermoset composite to a target state of cure.

FIG. 3 is a flowchart depicting methods 200, according to the present disclosure, of curing thermoset composite (TSC) to a desired and/or target state of cure (SOC). Methods 200 may include providing a process correlation at 210 and/or selecting an upper temperature threshold at 220. Methods 200 include heating the TSC at 230 and ceasing heating of the TSC at 240. The providing at 210 may include performing a plurality of thermal simulations at 212 and/or generating the process correlation at 214. During the heating at 230, methods 200 include monitoring an actual temperature of the TSC at 232, determining a maximum temperature of the TSC at 234, and determining an elapsed time that the TSC is above a threshold temperature at 236.

The TSC may be included in and/or form a portion of any suitable cured thermoset composite part, such as cured thermoset composite part 100 of FIGS. 1-2, that may be formed, fabricated, and/or cured utilizing the methods disclosed herein. As an example, the TSC may include a plurality of plies, or layers, of composite material. The plies may include and/or be formed from a plurality of fibers. The fibers may be coated and/or impregnated by a thermosetting resin. Under these conditions, the TSC also may be referred to herein as a pre-impregnated, or pre-preg, material. However, other TSCs also are within the scope of the present disclosure. As an example, the TSC may include a dry fiber bed and/or fabric that is coated, infused, and/or injected with the thermosetting resin.

Examples of the fibers include any suitable carbon fiber, polymeric fiber, glass fiber, organic fiber, inorganic fiber, aramid fiber, silicon fiber, metal fiber, aluminum fiber, boron fiber, tungsten carbide fiber, naturally occurring fiber, and/or man-made fiber. The fibers may be arranged, relative to one another, in any suitable manner. Examples include chopped fibers in a random orientation, a single tow, a narrow tow, woven fabrics, mats, knitted fabrics, bundles, and/or braids. The fibers may be long (e.g., over 10 millimeters in length) or short (e.g., less than 10 millimeters in length).

Examples of the thermosetting resin include any suitable resin that may be cured with a curing agent and/or crosslinking compound utilizing an externally applied source of energy to form and/or define a three-dimensional crosslinked network. Examples of thermosetting resins include a thermoset epoxy, a thermoset adhesive, a thermoset polymer, epoxy resins, epoxy novolac resins, ester resins, vinyl ester resins, cyanate ester resins, maleimide resins, bismaleimide resins, bismaleimide-triazine resins, phenolic resins, novolac resins, resorcinolic resins, unsaturated polyester resins, diallyl phthalate resins, urea resins, melamine resins, benzoxazine resins, polyurethanes, and/or mixtures thereof.

As discussed, prior art methods for curing uncured TSCs generally are configured to produce and/or generate a fully cured, or an at least substantially fully cured, TSC and may inefficiently cure the uncured TSC, thereby not best utilizing factory resources. This especially may be true of TSCs that are utilized as part of a co-bonding process, in which a first, fully cured, TSC is assembled with a second, uncured, TSC to produce a TSC assembly and the TSC assembly is cured a second time to produce a cured TSC assembly and bond the first TSC and the second TSC together.

Stated another way, and while not required, the methods disclosed herein generally are utilized to cure an uncured TSC to a target SOC that is different from the fully cured, or at least substantially fully cured, TSC of the prior art. Such a method, which may be referred to herein as producing and/or generating a partially cured TSC that has a target SOC, may be an intermediate step in a manufacturing process. As an example, the partially cured TSC with the target SOC may be utilized in conjunction with the above-described co-bonding process to produce and/or generate a cured TSC assembly while, at the same time, increasing an efficiency of the process utilized to produce the cured TSC assembly. Thus, methods 200, which are disclosed herein, may represent, or may be referred to herein as, lean, time-optimized, and/or time-conserving methods for curing the uncured TSC and/or for producing the cured TSC assembly.

The target SOC for the partially cured TSC also may be referred to herein as a cure state, as a target cure state, as a degree of cure, and/or as a target degree of cure for the partially cured TSC and may be defined in any suitable manner. As examples, the target SOC may be defined as, or by, a desired and/or target percentage of crosslinking within the resin that comprises the partially cured TSC and/or a desired and/or target percent reaction conversion of the resin. Examples of the target SOC include a SOC of at least 10%, at least 20%, at least 30%, at least 40%, at least 50%, at least 60%, at least 70%, at least 80%, at least 90%, at most 95%, at most 90%, at most 85%, at most 80%, at most 75%, at most 70%, at most 65%, at most 60%, at most 50%, and/or at most 40%.

As used herein, the phrases "uncured TSC" and/or "green TSC" may refer to a thermoset composite that is uncured, is at least substantially uncured, has not been purposefully cured, is in a flexible state, is in a state in which the thermoset composite may be laid up, molded, and/or shaped, has not been heated, and/or has less than a threshold percentage crosslinking within the resin that comprises the thermoset composite. As examples, the percentage crosslinking of the uncured TSC may be less than 20%, less than 15%, less than 10%, less than 5%, and/or less than 1%.

As used herein, the phrases "cured TSC" and/or "cured thermoset composite part" may refer to a thermoset composite that has been fully, or at least substantially fully, cured. As examples, a SOC of the cured TSC may be greater than that of the partially cured TSC and/or may be at least 80%, at least 85%, at least 90%, at least 95%, at least 99%, and/or at least substantially, or effectively, 100%.

As used herein, the phrase "partially cured TSC" may refer to a thermoset composite that has been partially cured to the target SOC utilizing the methods disclosed herein. As discussed in more detail herein, such a partially cured TSC may exhibit many physical characteristics of a cured TSC while, at the same time, exhibiting a corresponding SOC that is incomplete and/or less than the SOC of a comparable fully cured TSC.

As used herein, the phrase "thermoset composite" or the acronym "TSC" may refer to any suitable thermoset composite that has any suitable SOC. As such, the phrase "thermoset composite" and/or the acronym "TSC" generally may be utilized to refer to an uncured TSC, to a cured TSC, and/or to a partially cured TSC.

The methods disclosed herein generally are described as being applicable to thermoset composites, and examples of such thermoset composites are disclosed herein. However, it is within the scope of the present disclosure that these methods also may be applied to and/or utilized with bulk thermoset materials that are not, necessarily, composites. An example of such a bulk thermoset material is the resin that is utilized in the TSCs disclosed herein. With this in mind, the phrase "thermoset composite" and/or the acronym "TSC" may be replaced herein with the phrase "bulk thermoset material" without departing from the scope of the present disclosure.

Providing the process correlation at 210 may include providing any suitable process correlation, or calibration, for the TSC and/or for curing of the TSC. The process correlation may describe a plurality of time-temperature trajectories, which may be taken by the TSC, to produce and/or generate the target SOC in the partially cured TSC. As an example, the process correlation may describe combinations of the elapsed time, as determined during the determining at 236, and the maximum temperature, as determined during the determining at 234, that produce and/or generate the target SOC within the partially cured TSC for a given threshold temperature.

The process correlation may differ with changes in the TSC, changes in the threshold temperature, and/or changes in the target SOC. Stated another way, the process correlation may be specific to a given TSC in a given configuration (e.g., a given TSC chemistry, a given TSC thickness, a different layup mandrel configuration, etc.), a given threshold temperature, and a given target SOC. Examples of the process correlation include a process correlation curve, which describes and/or illustrates a functional relationship between values of the maximum temperature and corresponding values of the elapsed time that produce the target SOC, a process correlation lookup table, which describes paired values of the maximum temperature and corresponding values of the elapsed time that produce the target SOC, and/or a process correlation function, which describes, or is fit to, the functional relationship between values of the maximum temperature and corresponding values of the elapsed time that produce the target SOC.

The threshold temperature may be selected and/or established in any suitable manner. As an example, the threshold temperature may be selected based, at least in part, on a composition, or a chemical composition, of the TSC. As another example, the threshold temperature may include, or be, a temperature above which crosslinking within the TSC occurs at a rate that is sufficient to permit processing, or curing, of the TSC within a reasonable, or economically viable, timeframe. As yet another example, the threshold temperature may include, or be, a minimum temperature for crosslinking of the TSC. As another example, the threshold temperature may include, or be, a temperature at which a resultant rate of cure, of the TSC, produces acceptable mechanical properties in the cured TSC and/or in the partially cured TSC. Examples of the threshold temperature include threshold temperatures of at least 70° C., at least 80° C., at least 90° C., at least 100° C., at least 110° C., at least 120° C., at least 130° C., at least 135° C., at least 140° C., at least 145° C., at least 150° C., at least 155° C., at least 160° C., at least 165° C., at least 170° C., at most 200° C., at most 195° C., at most 190° C., at most 185° C., at most 180° C., at most 175° C., at most 170° C., at most 165° C., at most 160° C., and/or at most 155° C.

The providing at 210 may include providing in any suitable manner. As examples, the providing at 210 may include deriving the process correlation from semi-empirical models of the TSC, from cure kinetics of the TSC, and/or from heat transfer models of the TSC. As another example, the providing at 210 may include deriving the process correlation experimentally, such as via curing the TSC to the target SOC under specified conditions and/or cure process parameters. Examples of the specified conditions and/or cure process parameters include the threshold temperature, the elapsed time, a temperature ramp, or change, rate, and/or the maximum temperature. When the providing at 210 includes deriving the process correlation experimentally, the SOC of the TSC also may be determined experimentally and/or in any suitable manner.

Figure 4:
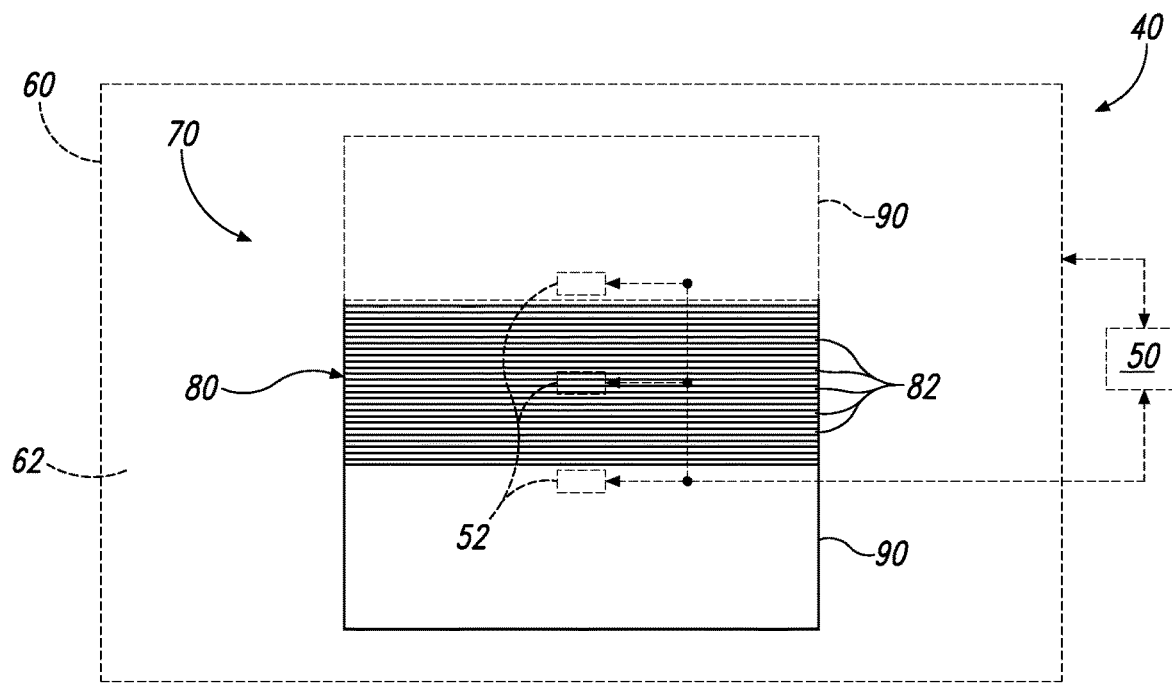
FIG. 4 is an example cross-sectional view of a model thermoset composite that may be utilized with the methods according to the present disclosure.

As a more specific example, the providing at 210 may include utilizing the performing at 212 and the generating at 214 to provide the process correlation. In such a method, a model simulation TSC may be provided and/or established. An example of such a model 70 of the TSC is illustrated in FIG. 4, in which a TSC, in the form of an uncured thermoset composite layup 80 including a plurality of plies 82, is positioned on a support, layup, and/or cure mandrel 90 or, as illustrated in dashed lines in FIG. 4, between two layup mandrels 90. As further illustrated in dashed lines in FIG. 4, methods 200 may include curing model 70 within a heating assembly 60, such as an oven and/or an autoclave. Heating assembly 60 may define a heated environment 62.

As illustrated in dashed lines in FIG. 4, a controller 50 may be adapted, configured, designed, constructed, and/or utilized to control the operation of heating assembly 60, such as via and/or utilizing methods 200, which are disclosed herein. As also illustrated in dashed lines in FIG. 4, one or more temperature detectors 52 may be utilized to monitor a temperature of thermoset composite layup 80. Temperature detectors 52, when present, may be configured to convey the temperature of the thermoset composite layup to controller 50; and controller 50 may control the operation of heating assembly 60 based, at least in part, on the temperature of the thermoset composite layup measured by temperature detectors 52. Heating assembly 60, heated environment 62, controller 50, temperature detectors 52, and/or model 70 also may be referred to herein as a system 40 for curing a thermoset composite.

The providing at 210 may be specific to a given and/or selected TSC, As such, changes in the TSC, or in the simulation model TSC, may produce, generate, and/or require a different process correlation. Examples of such changes in the TSC may include one or more of changes in the configuration of layup mandrels 90, presence and/or absence of layup mandrels 90, changes in a chemical composition of thermoset composite layup 80, changes in a number of plies 82 within thermoset composite layup 80, and/or changes in a thickness of thermoset composite layup 80.

The performing at 212 may include performing the plurality of thermal simulations on and/or utilizing the simulation model TSC. The plurality of thermal simulations includes kinetic models of the TSC and is performed for a plurality of distinct process conditions for curing of the TSC. Examples of the plurality of distinct process conditions for the TSC include one or more of a plurality of heated environment temperatures utilized during the heating at 230, a plurality of different heating rates for the TSC as utilized during the heating at 230, a plurality of different thicknesses for the TSC, a plurality of different heat transfer coefficients for the TSC, a plurality of different thicknesses for a support mandrel that supports the TSC during the heating at 230, and/or a plurality of different heat transfer coefficients for the support mandrel. The plurality of thermal simulations may be based, at least in part, on cure kinetics of the TSC and/or on a heat transfer model of the TSC.

Figure 5:
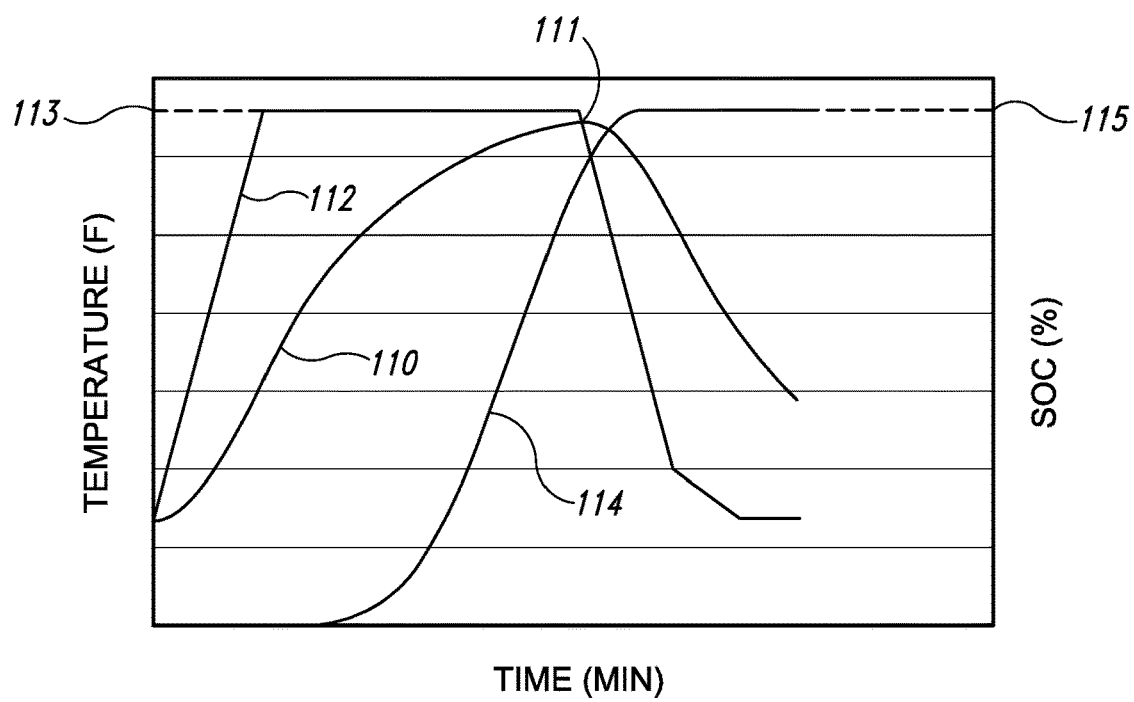
FIG. 5 is an example of temperature and degree of cure-time trajectory for the model thermoset composite of FIG. 4 under a specified set of process conditions.

An example of a single thermal simulation of the plurality of thermal simulations is illustrated in FIG. 5. Therein, a TSC temperature 110 of the TSC, an environment temperature 112 of the heated environment that is utilized to heat the TSC, and a SOC 114 of the TSC are plotted as a function of cure time. In the thermal simulation, the environment temperature is ramped to a steady-state temperature 113 and then maintained at the steady-state temperature for a period of time before decreasing. In response to heat transfer from the heated environment, TSC temperature 110 increases to a maximum temperature 111 and then decreases responsive to the decrease in environment temperature 112. Maximum temperature 111 also may be referred to herein as a maximum temperature 111 that is achieved by a real TSC during heating of the real TSC. Responsive to the overall heat cycle of the TSC, as represented by TSC temperature 110, SOC 114 of the TSC increases to a final SOC 115.

Figure 6:
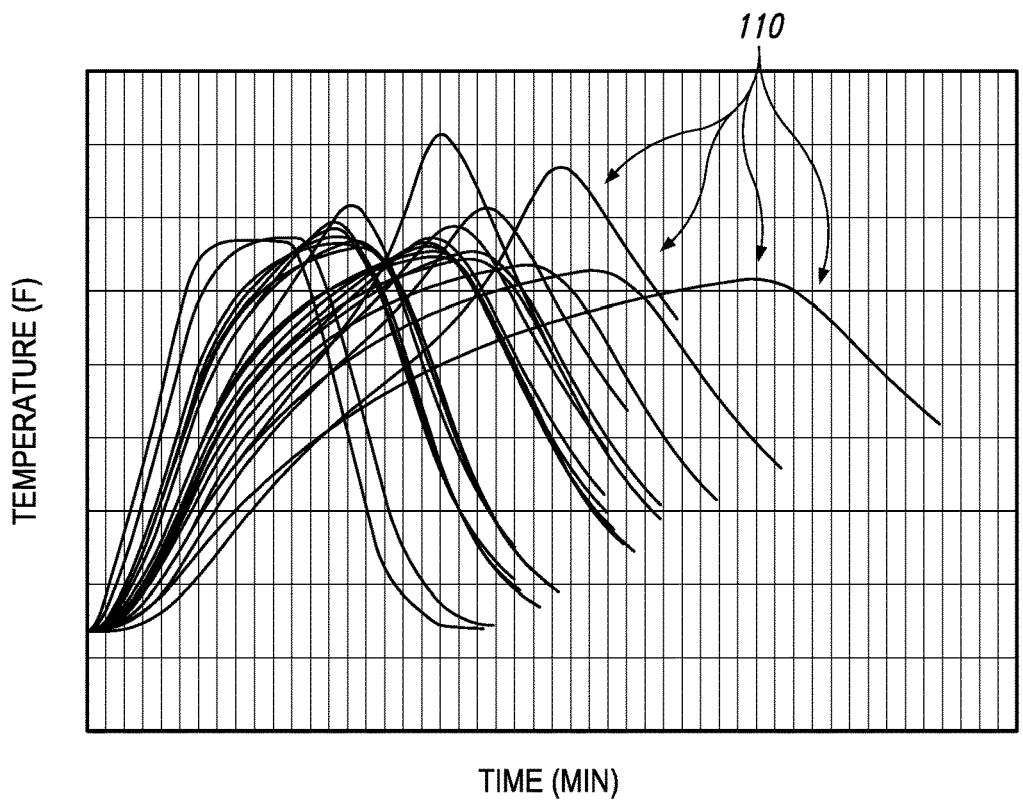
FIG. 6 is an example of a plurality of temperature-time trajectories generated for the model thermoset composite of FIG. 4 under a plurality of distinct process conditions, wherein each of the plurality of temperature time trajectories produces the same state of cure for the model thermoset composite.

FIG. 6 illustrates TSC temperature 110 as a function of time for a plurality of thermal simulations, including the thermal simulation of FIG. 5. To generate the various TSC temperature 110 curves illustrated in FIG. 6, the plurality of thermal simulations is performed for a variety of different materials for layup mandrels 90, for a variety of different thicknesses for layup mandrels 90, for a variety of different thicknesses for thermoset composite layup 80, and for a variety of different heat transfer coefficients between model TSC 70 of FIG. 4 and heated environment 62. Each of the illustrated thermal simulations takes the TSC of FIG. 4 to the same, to the desired, and/or to a target SOC (e.g., approximately 75%, as illustrated in FIG. 5). In addition, each of the illustrated thermal simulations is generated utilizing the same heating profile (e.g., as illustrated by environment temperature 112 of FIG. 5); however, this is not required, and it is within the scope of the present disclosure that the plurality of thermal simulations may utilize a plurality of different heating profiles.

Figure 7:
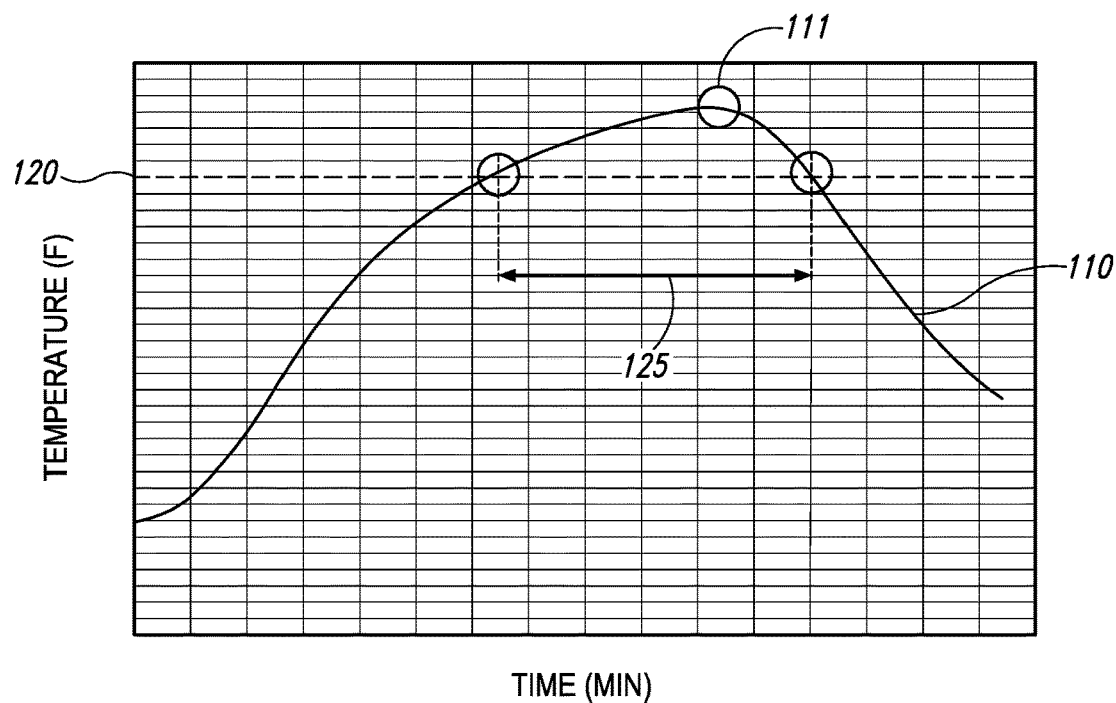
FIG. 7 is an example of a temperature-time trajectory for the model thermoset composite of FIG. 4 illustrating a threshold temperature, a maximum temperature, and an elapsed time that the actual temperature of the thermoset composite is greater than the threshold temperature for the model thermoset composite of FIG. 4.
Figure 8:
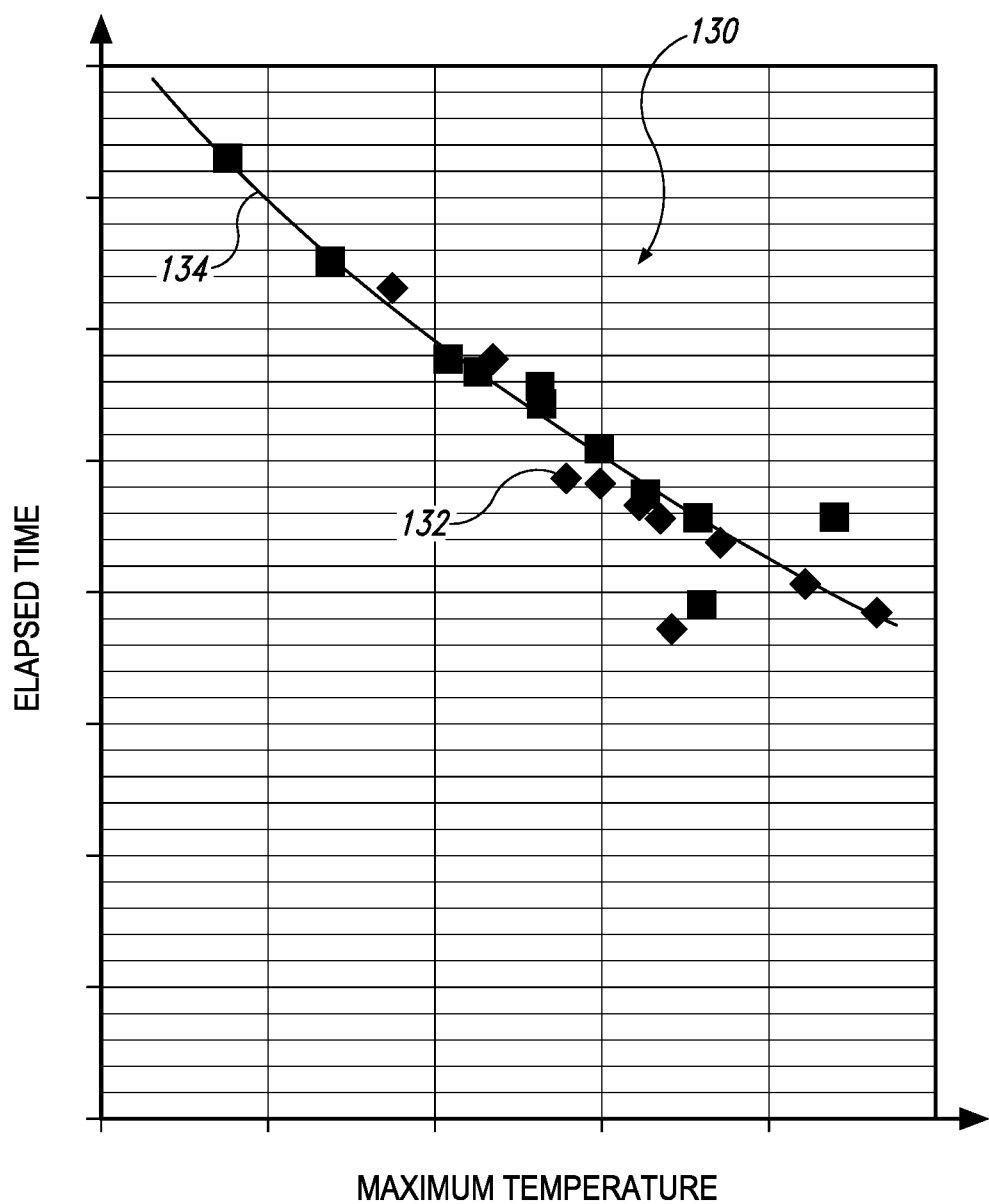
FIG. 8 is a plot of elapsed time vs. maximum temperature to generate a target state of cure for the model thermoset composite of FIG. 4.

Generating the process correlation at 214 may include utilizing information from each of the plurality of thermal simulations. As an example, and as illustrated in FIG. 7, the generating at 214 may include determining maximum temperature 111 and an elapsed time 125 above a threshold temperature 120 for each of the plurality of thermal simulations. As another example, and as illustrated in FIG. 8, the generating at 214 may include plotting the elapsed time as a function of maximum temperature for each of the plurality of thermal simulations. The plot of FIG. 8 then may be utilized as the process correlation, as indicated in FIG. 8 at 130. Such a process correlation may be created for a specific SOC, such as 75% in the example of FIG. 8.

Additionally or alternatively, the plot of FIG. 8 may be curve fit to provide a process correlation function 134, which is discussed herein, and/or the data utilized to generate the plot of FIG. 8 may be utilized to generate the process correlation lookup table, which is discussed herein. Process correlation function 134, when utilized, may include and/or define any suitable functional relationship between the elapsed time and the maximum temperature. Examples of process correlation function 134 include a linear function, a polynomial function, and/or an arcuate function.

Selecting the upper temperature threshold at 220 may include selecting any suitable upper temperature threshold for the TSC during the heating at 230. The selecting at 220 may be performed prior to the heating at 230; and when methods 200 include the selecting at 220, the heating at 230 may include maintaining the maximum temperature of the TSC below the upper temperature threshold.

Thermoset composites may undergo an exothermic reaction upon being heated and/or cured. This exothermic reaction, which also may be referred to herein as an exotherm, may cause the temperature of the TSC to increase, to rapidly increase, and/or to increase above a temperature of the heated environment that is utilized to heat the TSC. As such, the exothermic reaction may make it more difficult to control and/or regulate the temperature of the TSC; however, the upper temperature threshold may be selected to decrease a potential for and/or to avoid the exotherm, thereby permitting more accurate control of the temperature of the TSC and/or of the maximum temperature of the TSC that is experienced during the heating at 230.

Additionally or alternatively, certain downstream manufacturing steps, which may be performed utilizing the partially cured TSC subsequent to performing methods 200 on the TSC, may be impacted by the maximum temperature of the partially cured TSC that is achieved during the heating at 230 and/or by the elapsed time that the TSC is above the threshold temperature. As an example, and when the TSC is utilized in a co-bonding process, a bond strength between the TSC and an uncured TSC may be negatively impacted by high temperatures, experienced by the TSC, during the heating at 230. Thus, the selecting at 220 may be utilized to improve the bond strength experienced in the co-bonding process.

Heating the TSC at 230 may include heating the TSC in any suitable manner and/or utilizing any suitable structure and/or structures. As examples, the heating at 230 may include one or more of heating via convective heat transfer to the TSC, heating via conductive heat transfer to the TSC, and/or heating via radiative heat transfer to the TSC. As more specific examples, the heating at 230 may include heating within a heating assembly, such as heating assembly 60 of FIG. 4, and/or heating a support mandrel, such as layup mandrel 90 of FIG. 4, that supports the TSC during the heating at 230.

As another example, the heating at 230 may include heating within a heated environment that surrounds the TSC, such as heated environment 62 of FIG. 4, by increasing a temperature of the heated environment. As yet another example, the heating at 230 may include exposing the TSC to a heat source and/or applying thermal energy to the TSC with, via, and/or utilizing the heat source. Under these conditions, the ceasing at 240 may include ceasing application of the thermal energy to the TSC with the heat source.

When the heating at 230 includes heating with the heat source, the heating at 230 further may include ramping a temperature of the heat source to a soak, or steady state, temperature, such as steady-state temperature 113 of FIG. 5 and maintaining the temperature of the heat source at the steady-state temperature for a threshold soak time. The steady-state temperature is greater than the threshold temperature; and, when methods 200 include the selecting at 220, the steady-state temperature may be less than the upper temperature threshold. Examples of the steady-state temperature include steady-state temperatures of at least 80° C., at least 90° C., at least 93.3° C., at least 100° C., at least 110° C., at least 120° C., at least 130° C., at least 140° C., at least 150° C., at least 160° C., at least 170° C., at least 179.4° C., at least 180° C., at least 190° C., at least 200° C., at most 250° C., at most 225° C., at most 200° C., at most 190° C., at most 180° C., at most 170° C., at most 160° C., at most 150° C., at most 140° C., at most 130° C., at most 120° C., at most 110° C., at most 100° C., and/or at most 95° C.

As discussed, and during the heating at 230, methods 200 include monitoring the actual temperature of the TSC at 232, determining the maximum temperature of the TSC at 234, and determining the elapsed time that the TSC is above, or greater than, the threshold temperature at 236. Monitoring the actual temperature of the TSC at 232 may include monitoring with, via, and/or utilizing a temperature detector, such as temperature detectors 52 of FIG. 4. Examples of the temperature detector include, but are not limited to, a thermocouple, a resistance thermal detector (RTD), and/or an infrared (IR) temperature sensor.

It is within the scope of the present disclosure that the monitoring at 232 may include monitoring a select temperature of a select, specified, and/or predetermined location on the TSC, monitoring an average temperature of the TSC, and/or monitoring a lowest temperature of the TSC. Additionally or alternatively, the monitoring at 232 also may include monitoring a plurality of actual temperatures of the TSC at a plurality of spaced-apart locations on the TSC. The actual temperature of the TSC also may be referred to herein as and/or may be a part temperature, a part temperature of the TSC, a temperature of the TSC, a measured temperature of the TSC, and/or a monitored temperature of the TSC. It is within the scope of the present disclosure that the actual temperature of the TSC may be measured, or directly measured, on the TSC, such as via direct thermal contact between the temperature detector and the TSC. Additionally or alternatively, it is also within the scope of the present disclosure that the actual temperature of the TSC may be indirectly measured, calculated, and/or inferred, such as via knowledge of the temperature of the heated environment that surrounds the TSC.

Determining the maximum temperature of the TSC at 234 may include measuring and/or determining the maximum temperature achieved by the TSC during the heating at 230. When the monitoring at 232 includes monitoring a single location and/or an average temperature of the TSC, the maximum temperature may be the maximum temperature at the single location and/or the maximum of the average temperature of the TSC. Alternatively, when the monitoring at 232 includes monitoring at the plurality of spaced-apart locations on the TSC, the maximum temperature of the TSC may include, or be, a lowest monitored temperature of the TSC as measured at a lowest temperature location of the plurality of spaced-apart locations on the TSC. Such a lowest monitored temperature also may be referred to herein as a lagging temperature of the TSC and/or as a temperature of a lagging temperature detector. The lowest monitored temperature may represent the temperature of the least-cured location of the plurality of spaced-apart locations on the partially cured TSC. As such, a SOC at the location of the lowest monitored temperature may be a least, or lowest, SOC of the partially cured TSC across the plurality of spaced-apart locations on the partially cured TSC.

Determining the elapsed time that the TSC is above, or greater than, the threshold temperature at 236 may include determining a time period, or an elapsed time, that begins when the actual temperature of the TSC exceeds the threshold temperature and ends when the ceasing is initiated. An example of this elapsed time is illustrated in FIG. 7 and discussed in more detail herein with reference thereto. In general, FIG. 7 illustrates an entirety of a time that the temperature of the TSC exceeds the threshold temperature. Since it may take a finite amount of cooling time for the TSC to cool to below the threshold temperature subsequent to the ceasing at 240, the entire time that the temperature of the TSC exceeds the threshold temperature may be greater than the elapsed time that is determined during the determining at 236. Additionally or alternatively, the determining at 236 may include an estimate of the cooling time and thus may estimate a total elapsed time as a sum of the estimated cooling time and the time period that begins when the actual temperature of the TSC exceeds the threshold temperature and ends when the ceasing is initiated.

Ceasing heating of the TSC at 240 may include ceasing based, at least in part, on the maximum temperature of the TSC, such as is determined during the determining at 234, and on the elapsed time, such as is determined during the determining at 236. As an example, the ceasing at 240 may include ceasing, or initiating the ceasing, based, at least in part, on a relationship between the maximum temperature of the TSC and the elapsed time. An example of such a relationship is illustrated in FIG. 8 and discussed in more detail herein with reference thereto.

As a more specific example, and when methods 200 include the providing at 210, the ceasing at 240 may include ceasing responsive to the process correlation indicating that the TSC has reached, or will reach, the target SOC (e.g., that the TSC is the partially cured TSC). As another more specific example, and when methods 200 include the providing at 210, the ceasing at 240 may include ceasing responsive to the elapsed time exceeding a threshold elapsed time, for the maximum temperature of the TSC, that produces the target SOC. As yet another example, and when methods 200 include the providing at 210, the ceasing at 240 may include ceasing responsive to the maximum temperature exceeding a threshold maximum temperature, for the current elapsed time, that produces the target SOC.

The ceasing at 240 may include ceasing in any suitable manner. As an example, the ceasing at 240 may include ceasing application of heat to the TSC. As another example, the ceasing at 240 may include decreasing the temperature of the heated environment that surrounds the TSC during the heating at 230.

Methods 200, which are disclosed herein, may provide several significant benefits over prior art methods for curing TSCs. As an example, and as discussed, prior art methods generally are configured to completely, or at least substantially completely, cure a thermoset composite by ensuring that the thermoset composite is above a threshold temperature for at least a threshold time. As such, these prior art methods disregard a maximum temperature that is achieved by the thermoset composite, disregard a temperature trajectory that is taken by the thermoset composite during the curing process, and/or disregard when a peak exotherm temperature of the thermoset composite exceeds an upper threshold temperature. As discussed, this generally results in, or requires, inefficient curing of the thermoset composite and introduces inefficiencies into the curing process.

In addition, when the target SOC results in a partially cured TSC, such a partially cured TSC may exhibit other beneficial, or even improved, characteristics when compared to a comparable fully cured TSC. As an example, the partially cured TSC may exhibit lower moisture absorption relative to the comparable fully cured TSC. As more specific examples, moisture absorption by the partially cured TSC may be 0.05 weight percent (wt %), 0.1 wt %, 0.15 wt %, and/or 0.2 wt % less than the moisture absorption exhibited by the comparable fully cured TSC, and this difference in moisture absorption may increase with a greater difference between the SOC of the partially cured TSC and the SOC of the comparable fully cured TSC.

In contrast, methods 200, which are disclosed herein, are configured to cure the TSC to any suitable SOC, including a SOC that is less than fully cured (e.g., less than 80%, less than 85%, less than 90%, less than 95%, and/or less than 99% SOC). Methods 200 control the curing process based upon both the elapsed time above the threshold temperature and the maximum temperature of the TSC and thus consider the temperature trajectory taken by the TSC during the curing process. This consideration of the temperature trajectory provides the additional information needed to cure the TSC to the target SOC reproducibly and/or efficiently. Methods 200 also permit the curing time to be adjusted, during the curing process, responsive to unexpected events such as heat disruption due to power outages, etc.

Figure 9:
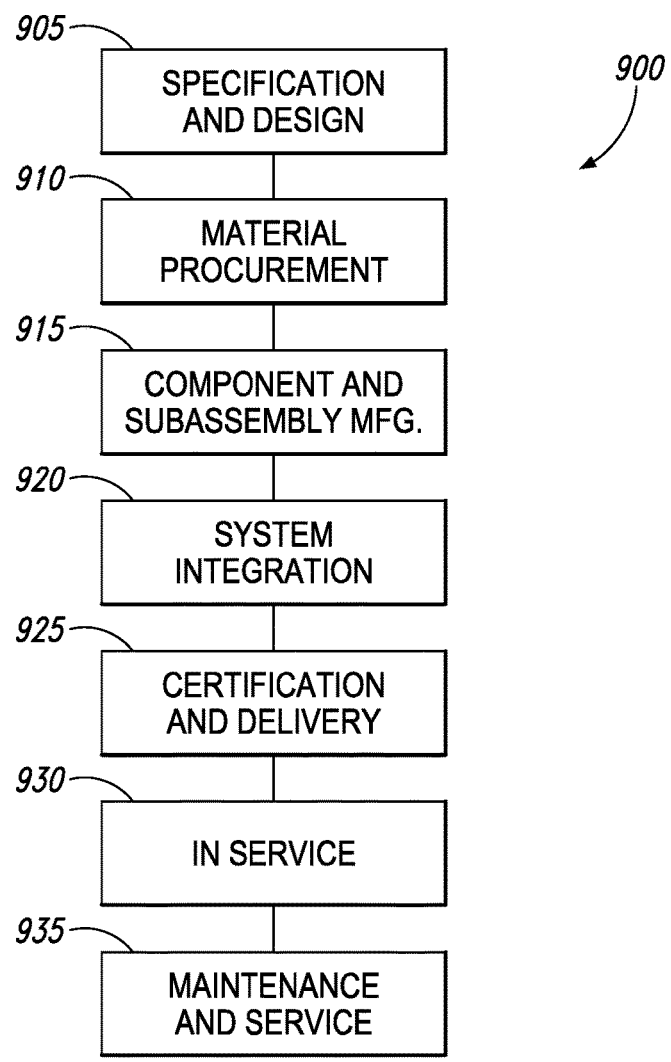
FIG. 9 is a flow diagram of aircraft production and service methodology.
Figure 10:
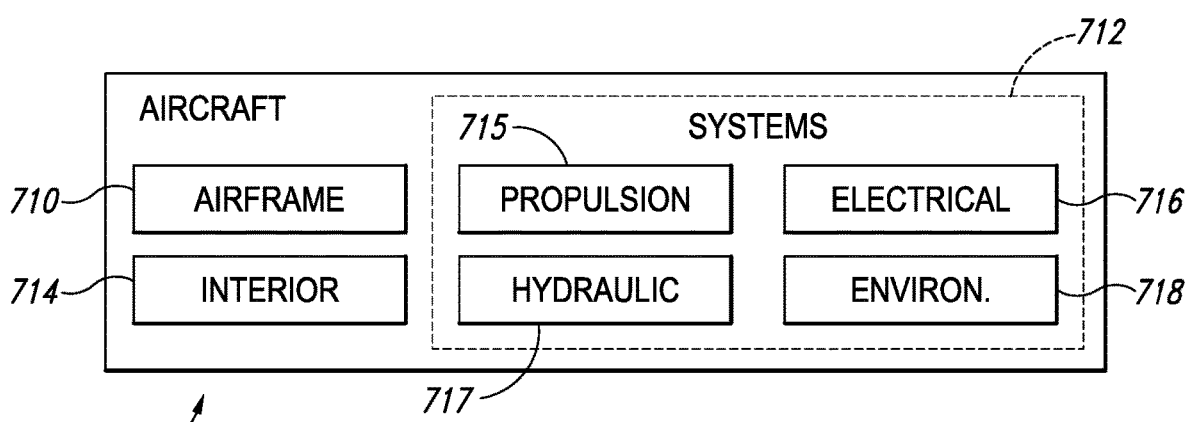
FIG. 10 is a block diagram of an aircraft.

Referring now to FIGS. 9-10, embodiments of the disclosure may be described in the context of an aircraft manufacturing and service method 900, as shown in FIG. 9, and/or an aircraft 700, as shown in FIG. 10. During pre-production, exemplary method 900 may include specification and design 905 of the aircraft 700 and material procurement 910. During production, component and subassembly manufacturing 915 and system integration 920 of the aircraft 700 take place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more of system embodiments, method embodiments, or a combination thereof may be utilized during the production stages 915 and 920, for example, by substantially expediting assembly of or reducing the cost of an aircraft 700. Similarly, one or more of system embodiments, method embodiments, or a combination thereof may be utilized while the aircraft 700 is in service, for example and without limitation, during maintenance and service 935.

Next, methods 200 are explained in the context of a working example. In the working example, a process correlation, such as process correlation 130 of FIG. 8, was utilized to select a process condition 132 that provides a maximum temperature and a corresponding elapsed time that will produce a target SOC for a TSC. In the working example, process condition 132 corresponds to a maximum temperature of 326.7° F. (163.7° C.) and an elapsed time of 104 minutes. Process correlation 130 of FIG. 8, which is based on the model simulations, is expected to provide conditions under which a SOC for the TSC is approximately 75%.

Subsequently, a TSC was placed within an autoclave. A heat cycle was performed in which environment temperature 112 within the autoclave was ramped from ambient up to steady-state temperature 113 of approximately 340° F. (171° C.) before being ramped back down to ambient. Concurrently, TSC temperature 110 was monitored and, responsive to the increase in environment temperature 112, TSC temperature 110 increased to a maximum temperature 111 of 326.7° F. (163.7° C.). In addition, the TSC remained above a threshold temperature 120 of 280° F. (138° C.), as illustrated in FIG. 7, for an elapsed time 125 of 104 minutes. This heat cycle cured the TSC to a SOC of approximately 74.7%.

Illustrative, non-exclusive examples of inventive subject matter according to the present disclosure are described in the following enumerated paragraphs:

A1. A method of curing a thermoset composite (TSC) to a target state of cure (SOC), the method comprising:
heating the TSC to greater than a threshold temperature;
during the heating:
(i) monitoring an actual temperature of the TSC;
(ii) determining a maximum temperature achieved by the TSC; and
(iii) determining an elapsed time that the actual temperature of the TSC is greater than the threshold temperature; and ceasing the heating based, at least in part, on the maximum temperature of the TSC and the elapsed time.

A2. The method of paragraph A1, wherein the ceasing is based, at least in part, on a relationship between the maximum temperature of the TSC and the elapsed time.

A3. The method of any of paragraphs A1-A2, wherein the method further includes providing, for the target SOC of the TSC, a process correlation, or calibration.

A4. The method of paragraph A3, wherein the process correlation describes combinations of the elapsed time and the maximum temperature of the TSC that produce the target SOC.

A5. The method of paragraph A3, wherein a process correlation for a given target SOC differs from a process correlation for a different target SOC.

A6. The method of any of paragraphs A3-A5, wherein a process correlation for a given threshold temperature differs from a process correlation for a different threshold temperature.

A7. The method of any of paragraphs A3-A6, wherein the process correlation includes at least one of:
(i) a process correlation curve describing a functional relationship between values of the maximum temperature and corresponding values of the elapsed time that produce the target SOC;
(ii) a process correlation lookup table describing paired values of the maximum temperature and corresponding values of the elapsed time that produce the target SOC; and
(iii) a process correlation function describing the functional relationship between values of the maximum temperature and corresponding values of the elapsed time that produce the target SOC.

A8. The method of any of paragraphs A3-A7, wherein at least one of:
(i) the process correlation is derived from semi-empirical models of the TSC, cure kinetics of the TSC, and heat transfer modeling of the TSC;
(ii) the method further includes deriving the process correlation from semi-empirical models of the TSC, cure kinetics of the TSC, and heat transfer modelling of the TSC;
(iii) the process correlation is derived experimentally; and
(iv) the method further includes deriving the process correlation experimentally.

A9. The method of any of paragraphs A3-A8, wherein the ceasing includes ceasing responsive to the process correlation indicating that the TSC has reached the target SOC.

A10. The method of any of paragraphs A1-A9, wherein the ceasing includes ceasing responsive to the elapsed time exceeding a threshold elapsed time, for the maximum temperature, that produces the target SOC.

A11. The method of any of paragraphs A1-A10, wherein the ceasing includes ceasing responsive to the maximum temperature exceeding a threshold maximum temperature, for the elapsed time, that produces the target SOC.

A12. The method of any of paragraphs A3-A11, wherein the providing the process correlation includes performing a plurality of thermal simulations, which include cure kinetic models, of the TSC for a plurality of distinct process conditions and generating the process correlation from the plurality of thermal simulations, wherein each thermal simulation in the plurality of thermal simulations models curing of the TSC to the target SOC.

A13. The method of paragraph A12, wherein the plurality of distinct process conditions includes at least one of:
(i) a plurality of different heated environment temperatures utilized during the heating the TSC;
(ii) a plurality of different heat rates for the TSC;
(iii) a plurality of different thicknesses for the TSC;
(iv) a plurality of different heat transfer coefficients for the TSC;
(v) a plurality of different thicknesses for a support mandrel that supports the TSC during the heating; and
(vi) a plurality of different heat transfer coefficients for the support mandrel.

A14. The method of any of paragraphs A12-A13, wherein the plurality of thermal simulations is based, at least in part, on a cure kinetics and heat transfer model of the TSC.

A15. The method of any of paragraphs A1-A14, wherein, prior to the heating, the method further includes selecting an upper temperature threshold for the TSC during the heating, and further wherein the heating includes maintaining the maximum temperature of the TSC below the upper temperature threshold.

A16. The method of any of paragraphs A1-A15, wherein the heating includes at least one of:
(i) heating via convective heat transfer to the TSC;
(ii) heating via conductive heat transfer to the TSC; and
(iii) heating via radiative heat transfer to the TSC.

A17. The method of any of paragraphs A1-A16, wherein the heating includes at least one of:
heating within an oven;
(ii) heating within an autoclave; and
(iii) heating a/the support mandrel that supports the TSC during the heating.

A18. The method of any of paragraphs A1-A17, wherein the heating includes heating within a heated environment, which surrounds the TSC, by increasing a temperature of the heated environment.

A19. The method of any of paragraphs A1-A18, wherein the heating includes exposing the TSC to a heat source.

A20. The method of paragraph A19, wherein the heating includes applying thermal energy to the TSC with the heat source.

A21. The method of paragraph A20, wherein the ceasing includes ceasing application of the thermal energy to the TSC with the heat source.

A22. The method of any of paragraphs A19-A21, wherein the heating includes ramping a temperature of the heat source to a soak temperature and maintaining the temperature of the heat source at the soak temperature.

A23. The method of paragraph A22, wherein the soak temperature is at least one of:
(i) greater than the maximum temperature; and
(ii) less than a/the upper temperature threshold.

A24. The method of any of paragraphs A22-A23, wherein the soak temperature is at least one of:
(i) at least 80° C., at least 90° C., at least 93.3° C., at least 100° C., at least 110° C., at least 120° C., at least 130° C., at least 140° C., at least 150° C., at least 160° C., at least 170° C., at least 179.4° C., at least 180° C., at least 190° C., or at least 200° C.; and
(ii) at most 250° C., at most 225° C., at most 200° C., at most 190° C., at most 180° C., at most 170° C., at most 160° C., at most 150° C., at most 140° C., at most 130° C., at most 120° C., at most 110° C., at most 100° C., or at most 95° C.

A25. The method of any of paragraphs A1-A24, wherein the ceasing includes ceasing application of heat to the TSC.

A26. The method of any of paragraphs A1-A25, wherein the ceasing includes decreasing a/the temperature of a/the heated environment, which surrounds the TSC.

A27. The method of any of paragraphs A1-A26, wherein the monitoring the actual temperature of the TSC includes monitoring with a temperature detector, optionally wherein the temperature detector includes at least one of:

(i) a thermocouple;
(ii) a resistance thermal detector; and
(iii) an infrared temperature sensor.

A28. The method of any of paragraphs A1-A27, wherein the monitoring the actual temperature of the TSC includes at least one of:
(i) monitoring a select temperature of a select location on the TSC;
(ii) monitoring an average temperature of the TSC; and
(iii) monitoring a lowest measured temperature of the TSC.

A29. The method of any of paragraphs A1-A28, wherein the monitoring the actual temperature of the TSC includes monitoring a plurality of actual temperatures of the TSC at a plurality of spaced-apart locations on the TSC.

A30. The method of paragraph A29, wherein the maximum temperature of the TSC is a lowest monitored temperature of the TSC measured at a lowest temperature location of the plurality of spaced-apart locations on the TSC.

A31. The method of any of paragraphs A1-A30, wherein the determining the elapsed time includes determining a time period that begins when the actual temperature of the TSC exceeds the threshold temperature and ends when the ceasing is initiated.

A32. The method of any of paragraphs A1-A31, wherein the target SOC includes at least one of:
(i) a target percentage of crosslinking within a resin of the TSC; and
(ii) a target percent reaction conversion of the resin of the TSC.

A33. The method of any of paragraphs A1-A32, wherein the target SOC is at least one of:
(i) at least 10%, at least 20%, at least 30%, at least 40%, at least 50%, at least 60%, at least 70%, at least 80%, or at least 90%; and
(ii) at most 95%, at most 90%, at most 85%, at most 80%, at most 75%, at most 70%, at most 65%, at most 60%, at most 50%, or at most 40%.

A34. The method of any of paragraphs A1-A33, wherein the thermoset composite includes a plurality of plies of composite material.

A35. The method of any of paragraphs A1-A34, wherein the thermoset composite includes, is, or is defined by, a plurality of fibers and a thermoset resin.

A36. The method of paragraph A35, wherein the thermoset resin includes a thermoset epoxy.

B1. A system for curing a thermoset composite, the system comprising:
a heating assembly that regulates a temperature of a heated environment;
a support mandrel positioned within the heated environment;
a thermoset composite positioned within the heated environment and supported by the support mandrel;
a temperature detector configured to monitor an actual temperature of the thermoset composite; and
a controller programmed to receive the temperature of the thermoset composite from the temperature detector and to control the temperature of the heated environment, by controlling the operation of the heating assembly, utilizing the method of any of paragraphs A1-A36.

C1. The use of any of the methods of any of paragraphs A1-A36 or the system of paragraph B1 to cure a thermoset composite (TSC) to a target state of cure (SOC).

D1. A thermoset composite (TSC) cured to a target state of cure (SOC) utilizing the method of any of paragraphs A1-A36.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method.

Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A method of curing a thermoset composite (TSC) to a target state of cure (SOC), the method comprising:
   heating the TSC to greater than a threshold temperature; during the heating:
   (i) monitoring an actual temperature of the TSC;
   (ii) determining a maximum temperature achieved by the TSC; and
   (iii) determining an elapsed time that the actual temperature of the TSC is greater than the threshold temperature; and
   ceasing the heating based, at least in part, on the maximum temperature of the TSC and the elapsed time;
   wherein the elapsed time is a time period that begins when the actual temperature of the TSC exceeds the threshold temperature and ends when the ceasing is initiated; and
   wherein the maximum temperature achieved by the TSC is the maximum temperature achieved at a given location on the TSC during the elapsed time.

2. The method of claim 1, wherein the ceasing is based, at least in part, on a relationship between the maximum temperature of the TSC and the elapsed time.

3. The method of claim 1, wherein the method further includes providing, for the target SOC of the TSC, a process correlation.

4. The method of claim 3, wherein the process correlation describes combinations of the elapsed time and the maximum temperature of the TSC that produce the target SOC.

5. The method of claim 3, wherein at least one of:
   (i) a process correlation for a given target SOC differs from a process correlation for a different target SOC; and
   (ii) a process correlation for a given threshold temperature differs from a process correlation for a different threshold temperature.

6. The method of claim 3, wherein the process correlation includes at least one of:
   (i) a process correlation curve describing a functional relationship between values of the maximum temperature and corresponding values of the elapsed time that produce the target SOC;
   (ii) a process correlation lookup table describing paired values of the maximum temperature and corresponding values of the elapsed time that produce the target SOC; and
   (iii) a process correlation function describing the functional relationship between values of the maximum temperature and corresponding values of the elapsed time that produce the target SOC.

7. The method of claim 3, wherein at least one of:
   (i) the process correlation is derived from semi-empirical models of the TSC, cure kinetics of the TSC, and heat transfer modeling of the TSC;
   (ii) the method further includes deriving the process correlation from semi-empirical models of the TSC, cure kinetics of the TSC, and heat transfer modelling of the TSC;
   (iii) the process correlation is derived experimentally; and
   (iv) the method further includes deriving the process correlation experimentally.

8. The method of claim 3, wherein the ceasing includes ceasing responsive to the process correlation indicating that the TSC has reached the target SOC.

9. The method of claim 3, wherein the ceasing includes ceasing responsive to the elapsed time exceeding a threshold elapsed time, for the maximum temperature, that produces the target SOC.

10. The method of claim 3, wherein the ceasing includes ceasing responsive to the maximum temperature exceeding a threshold maximum temperature, for the elapsed time, that produces the target SOC.

11. The method of claim 3, wherein the providing the process correlation includes performing a plurality of thermal simulations, which include cure kinetic models, of the TSC for a plurality of distinct process conditions and generating the process correlation from the plurality of thermal simulations, wherein each thermal simulation in the plurality of thermal simulations models curing of the TSC to the target SOC.

12. The method of claim 11, wherein the plurality of distinct process conditions includes at least one of:
   (i) a plurality of different heated environment temperatures utilized during the heating the TSC;
   (ii) a plurality of different heat rates for the TSC;
   (iii) a plurality of different thicknesses for the TSC;
   (iv) a plurality of different heat transfer coefficients for the TSC;
   (v) a plurality of different thicknesses for a support mandrel that supports the TSC during the heating; and
   (vi) a plurality of different heat transfer coefficients for the support mandrel.

13. The method of claim 11, wherein the plurality of thermal simulations is based, at least in part, on a cure kinetics and heat transfer model of the TSC.

14. The method of claim 1, wherein the ceasing includes at least one of:
   (i) ceasing application of heat to the TSC; and
   (ii) decreasing a temperature of a heated environment, which surrounds the TSC.

15. The method of claim 1, wherein the monitoring the actual temperature of the TSC includes monitoring with a temperature detector.

16. The method of claim 1, wherein the monitoring the actual temperature of the TSC includes at least one of:
   (i) monitoring a select temperature of a select location on the TSC;
   (ii) monitoring an average temperature of the TSC; and
   (iii) monitoring a lowest measured temperature of the TSC.

17. The method of claim 1, wherein the monitoring the actual temperature of the TSC includes monitoring a plurality of actual temperatures of the TSC at a plurality of spaced-apart locations on the TSC.

18. The method of claim 17, wherein the maximum temperature of the TSC is a lowest monitored temperature of the TSC measured at a lowest temperature location of the plurality of spaced-apart locations on the TSC.

19. A system for curing a thermoset composite, the system comprising:
 a heating assembly that regulates a temperature of a heated environment;
 a support mandrel positioned within the heated environment;
 the thermoset composite positioned within the heated environment and supported by the support mandrel;
 a temperature detector configured to monitor an actual temperature of the thermoset composite; and
 a controller programmed to receive the temperature of the thermoset composite from the temperature detector and to control the temperature of the heated environment, by controlling the operation of the heating assembly utilizing the method of claim 1.

20. A method of curing a thermoset composite (TSC) to a target state of cure (SOC), the method comprising:
 heating the TSC to greater than a threshold temperature;
 during the heating:
 (i) monitoring an actual temperature of the TSC;
 (ii) determining a maximum temperature achieved by the TSC; and
 (iii) determining an elapsed time that the actual temperature of the TSC is greater than the threshold temperature; and
 ceasing the heating based, at least in part, on the maximum temperature of the TSC and the elapsed time;
 wherein the elapsed time is a time period that begins when the actual temperature of the TSC exceeds the threshold temperature and ends when the ceasing is initiated;
 wherein the monitoring includes monitoring the actual temperature of the TSC at a plurality of spaced-apart locations on the TSC; and
 wherein the maximum temperature achieved by the TSC is an average maximum temperature achieved at the plurality of spaced-apart locations on the TSC during the elapsed time.

* * * * *